(12) United States Patent
Høiland et al.

(10) Patent No.: US 11,230,154 B2
(45) Date of Patent: Jan. 25, 2022

(54) CONNECTION SYSTEM FOR CONNECTING A DAMPING UNIT OF A MOTOR VEHICLE INSIDE A WHEEL SUSPENSION OF SAID VEHICLE

(71) Applicant: RAUFOSS TECHNOLOGY AS, Raufoss (NO)

(72) Inventors: Thorbjørn Høiland, Gjøvik (NO); Renata Bosca, Montreal (CA); Roald Egil Helland Pedersen, Kongsberg (NO); Håkon Johan Seiness, Kongsberg (NO); Ali Khajehgani, Hunndalen (NO)

(73) Assignee: RAUFOSS TECHNOLOGY AS, Raufoss (NO)

( * ) Notice: Subject to any disclaimer, the term of this patent is extended or adjusted under 35 U.S.C. 154(b) by 0 days.

(21) Appl. No.: 16/764,352

(22) PCT Filed: Nov. 22, 2018

(86) PCT No.: PCT/EP2018/082260
§ 371 (c)(1),
(2) Date: May 14, 2020

(87) PCT Pub. No.: WO2019/101881
PCT Pub. Date: May 31, 2019

(65) Prior Publication Data
US 2020/0290420 A1    Sep. 17, 2020

(30) Foreign Application Priority Data

Nov. 23, 2017   (DE) ..................... 10 2017 010 860.9
Oct. 12, 2018   (DE) ..................... 20 2018 004 756.2

(51) Int. Cl.
*B60G 13/00*    (2006.01)
*B21C 23/00*    (2006.01)
(Continued)

(52) U.S. Cl.
CPC .......... *B60G 13/005* (2013.01); *B21C 23/002* (2013.01); *B60G 3/06* (2013.01);
(Continued)

(58) Field of Classification Search
CPC ................ B60G 13/003; B60G 13/005; B60G 2204/129; B60G 2204/4304;
(Continued)

(56) References Cited

U.S. PATENT DOCUMENTS 5,080,388 A * 1/1992 Berry ....................... B60G 3/20
                                                280/124.136
5,782,484 A * 7/1998 Kuhn, Jr. ............... B60G 3/265
                                                       267/248

(Continued)

FOREIGN PATENT DOCUMENTS

CN   102107345 A  *  6/2011
CN   107237857 A  * 10/2017
(Continued)

OTHER PUBLICATIONS

Nakazawa, Manufacture of Fork Member to be Connected With Damper for Suspension Device, Jun. 29, 1993, EPO, JP H05161914 A, Machine Translation of Description (Year: 1993).*

(Continued)

*Primary Examiner* — Paul N Dickson
*Assistant Examiner* — Matthew D Lee
(74) *Attorney, Agent, or Firm* — Schwabe, Williamson & Wyatt, P.C.

(57) ABSTRACT

The invention relates to a connection system for connecting a damper unit of a vehicle inside a wheel suspension of the vehicle, the connection system having: an upper attachment region for attaching the damping unit, at least part of said region surrounding a receiving area for the damping unit and the receiving area extending around a first axis acting as the (Continued)

damping axis of the damping unit; a lower attachment region for coupling to the wheel-side portion of the wheel suspension, said lower attachment region having, in particular, two mutually spaced lower sections with an attachment area therebetween and an intermediate region which connects the upper attachment region to the lower attachment region. The main extension of the intermediate region corresponds to the direction of the first axis and the intermediate region allows the passage of a drive shaft of the vehicle. The connection system is made of an extruded part, the extrusion direction of which is the direction in which the extruded material extends, said material thus forming the intermediate region of the connection system. The invention also relates to a connection system comprising a clamping mechanism.

33 Claims, 14 Drawing Sheets

(51) Int. Cl.
    *B60G 3/06* (2006.01)
    *B60G 21/055* (2006.01)
    *C22C 21/00* (2006.01)
    *F16F 9/54* (2006.01)
(52) U.S. Cl.
    CPC .... *B60G 21/0551* (2013.01); *B60G 2200/142* (2013.01); *B60G 2204/129* (2013.01); *B60G 2204/1224* (2013.01); *B60G 2204/4304* (2013.01); *B60G 2206/11* (2013.01); *B60G 2206/7102* (2013.01); *B60G 2206/811* (2013.01); *B60G 2206/8105* (2013.01); *C22C 21/00* (2013.01); *F16F 9/54* (2013.01); *F16F 2224/0208* (2013.01); *F16F 2226/04* (2013.01)
(58) Field of Classification Search
    CPC ...... B60G 2206/8105; B60G 2206/811; B60G 2206/8103; B60G 2206/124
    See application file for complete search history.

(56) References Cited

U.S. PATENT DOCUMENTS

| | | | |
|---|---|---|---|
| 9,470,256 B2* | 10/2016 | Crewson | B21D 35/001 |
| 2003/0160372 A1* | 8/2003 | Klitsch | B60G 13/001 |
| | | | 267/195 |
| 2005/0212244 A1* | 9/2005 | Bobbitt, III | B60G 7/003 |
| | | | 280/86.751 |
| 2010/0117319 A1* | 5/2010 | Grozev | B60G 17/0523 |
| | | | 280/124.16 |
| 2010/0117320 A1* | 5/2010 | Grozev | B60G 17/0523 |
| | | | 280/124.16 |
| 2010/0223974 A1* | 9/2010 | Kucinski | B60G 13/005 |
| | | | 72/324 |
| 2020/0122537 A1* | 4/2020 | Schmidt | B60G 7/001 |

FOREIGN PATENT DOCUMENTS

| | | | | |
|---|---|---|---|---|
| EP | 1683663 A1 | | 7/2006 | |
| EP | 2614969 A1 | | 7/2013 | |
| JP | 05161913 A | * | 6/1993 | ............ B21K 1/74 |
| JP | 05161914 A | * | 6/1993 | ........... B21C 23/142 |
| JP | H05161914 A | * | 6/1993 | ........... B21C 23/142 |
| JP | 07246814 A | * | 9/1995 | |
| JP | H11294512 A | | 10/1999 | |
| KR | 20060057040 A | * | 5/2006 | |
| WO | 2008082305 A1 | | 7/2008 | |

OTHER PUBLICATIONS

Kami, Damper Supporting Member Structure in Suspension System for Vehicle, Sep. 26, 1995, EPO, JP 07246814 A, Machine Translation of Description (Year: 1995).*
International Search Report dated Jun. 16, 2019 for International Application No. PCT/EP2018/082260, 3 pages.
International Preliminary Report on Patentability dated Jun. 4, 2020 for International Application No. PCT/EP2018/082260, 3 pages.

* cited by examiner

Prior Art ( State of the art )

CONNECTION SYSTEM FOR CONNECTING A DAMPING UNIT OF A MOTOR VEHICLE INSIDE A WHEEL SUSPENSION OF SAID VEHICLE

CROSS REFERENCE TO RELATED APPLICATION

The present application is a 35 U.S.C. § 371 national phase entry application of, and claims priority to, International Patent Application No. PCT/EP2018/082260, filed Nov. 22, 2018, which claims priority to German Patent Application No. DE 202018004756.2, filed Oct. 12, 2018, and German Patent Application No. DE 102017010860.9, filed Nov. 23, 2017, the disclosures of which are hereby incorporated by reference in their entirety for all purposes.

BACKGROUND

The invention relates to a connection system for connecting a damping unit of a vehicle inside of a wheel suspension of the vehicle, wherein the connection system has an upper attachment region for attaching the damping unit, the attachment region in particular at least partially surrounds a receiving area for the damping unit, wherein the receiving area extends about a first axis acting as the damping axis of the damping unit, a lower attachment region for coupling to the wheel-side part of the wheel suspension, wherein the lower attachment region has, in particular, two lower sections spaced apart from one another with an attachment area therebetween, and an intermediate region, which connects the upper attachment region to the lower attachment region, wherein the main extension of the intermediate region corresponds to the direction of the first axis, and wherein the intermediate region allows the passage of a drive shaft of the vehicle.

These types of connection systems are well known in the area of vehicle technology. An exemplary connection system of the current prior art is shown in FIG. 1. The connection system, which might likewise be designated as a yoke based on its shape (and is so designated in the following), connects a damping and spring module, which forms a damping unit 3' comprising a lower suspension arm 2' of a front wheel suspension of a vehicle. Yoke 1' has at its upper end an inner, cylindrical coupling surface 8', which receives and fixes the damping unit 3'. Two legs 9' extend from coupling surface 8' in a forked way in order to have an opening 5' between them, through which a drive shaft 4' of the vehicle may pass. The lower suspension arm 2' is fixed at the lower ends of legs 9', for example, by a bolt 6' using a flexible bush 7'. In addition to the structure shown in FIG. 1, one of the legs of the yoke may be omitted, if the remaining leg has sufficient strength and, if necessary, is correspondingly reinforced.

Yokes of this type are primarily produced by means of a casting or forging process. Each method has its respective advantages. Thus, the casing method facilitates a high level of integration and also the possibility of creating a complex geometry of the yoke. The forging method facilitates the use of high-strength and ductile materials. Accordingly, conventional materials, like iron or aluminum, are used in the casting method, where, in contrast steel, or aluminum are used in the forging method.

The underlying object of the invention is to provide a connection system as defined at the outset, which has satisfactory mechanical properties for reliably connecting the damping unit to the wheel suspension, and which is producible in an efficient way.

This problem is essentially solved, with respect to the connection system, in that the connection system is made of an extruded part, whose extrusion direction is the extension direction of the extruded material, which then forms the intermediate region of the connection system. The production stages used may comprise cutting and (additional) shaping in order to achieve the form of the system.

In the context of the invention, it is namely recognized that these types of connection systems (yokes), when produced by casting, tend to be heavy. This is due to the strength and the endurance (fatigue) properties of the materials used, and the elongation before break, if damage or overloading should occur. In addition, cast yokes may have a tendency towards porosity, which is in turn compensated for by large cross sections, which lead to a high weight. The latter likewise occurs, if a comparatively light material is used, like aluminum. In addition, the casting method requires a high level of quality controls, such as visual inspection and also other methods, like the use of x-rays.

On the other hand, forged yokes yield, as a positive property, lightweight products using heat-treatable, high-strength materials. However, the production is comparatively complex and is linked to higher costs. Namely, the material consumption during forging is typically high, due to the amount of "flash" created, which has to be cut off of the product. In addition, the three-dimensional, "irregular" shape of the yoke leads to a complex forging process, which involves carrying out one or more steps before the product is finish-forged. Afterwards, the flash has to be removed in a separate operation. The forging method also requires inspection steps after the forging, like visual inspections, or a dye penetration test to check for forging flaws or heat cracks.

Another production method for yokes, which is utilized in the field, is deep drawing. Due to the nature of the deep drawing process, however, comparatively thin sheet metal material is used, in the range from 3 to 5 mm, a thickness that does not sufficiently contribute as such to the stiffness and strength of the yoke. This is then compensated for by large surface portions, into which a "shape" may likewise be incorporated, which results in comparatively bulky and heavy yokes. As there is only a limited installation space for integrating the yoke in the complete chassis system, a conflict exists in finding sufficient accommodation space and maintaining sufficient performance of the yoke with respect to strength and stiffness.

In contrast, the connection system according to the present invention is formed from an extruded part (extrusion profile), whose extrusion direction is the extension direction of the extruded material region of the extruded part, which then (i.e., in the finished connection system) forms the intermediate region of the connection system. By this means, in comparison to the other methods explained above, an effective method is provided for producing the yoke geometry, even though the extruded part itself may not yet define all aspects of the required three-dimensional geometry of the yoke. However, it is possible using the extrusion method to provide extruded material close to the regions, where the material is effectively arranged in the connection system, and extruded material without functional connections for the connection system may be removed by a cutting process and recycled into the production process, so that an efficient use of the extruded material is likewise provided. The extrusion material is preferably a high-strength aluminum alloy, e.g., in the 6000 or 7000 series, which provides advantageous strengths and stiffnesses of the connection system despite its comparatively low weight (i.e., densities in the range between 2.7 and 2.8 g/cm3), in particular with efficient cross sections, so that the cross section resists the bending moments with low consumption of material resources, due to the material distribution about the main bending axes.

In addition, the axial extension of the upper attachment region is decoupled from a cross-sectional surface of the material in the extrusion process, which then forms the intermediate region for the connection system according to the present invention.

Due to the extrusion process, the overall dimensions, in particular the strength and stiffness, may be scaled, in order to adapt to different loads in the expected use of the connection system, e.g., in differently configured vehicles. A typical strength may lie in the range from 40 to 80 kN of axial load in the damping direction.

As in a preferred embodiment, the axial extension of the connection system along the first axis essentially corresponds to a deposition length of the extruded part or is shorter by an amount, by which the connection system is reduced due to the bending of a leg/of the legs, which enlarges a free space for the passage of the drive shaft. This enables an additional material savings in the production process.

Furthermore, the free space may be formed at least partially by a cutout of extruded material underneath the extruded material forming the upper attachment region, or by a shaping of this material. This enables sufficient free space in the finished connection system, even though extruded material for the extruded part would otherwise at least partially block the free space. The amount of cutout material may be more than 30%, more than 50%, and also more than 70% of the difference in the material amounts between the finished connection system and the extruded part.

In another embodiment, the extruded part may have an extruded material region, which then partially forms a functional element of the connection system, however, it also extends in the (first) receiving area. In this case, although the material lies in the (first) receiving area and therefore must be removed in a subsequent process step subsequent to the extrusion, this additional step is accepted in order to obtain additional extruded material underneath the upper attachment region. This extruded material region is the region, which results by extruding through the same shaping surface perpendicular to the extrusion direction.

With regard to this, the functional elements may be one or more reinforcing ribs for the one or the multiple legs of the intermediate region, or a bridge connecting the two lower sections to one another. The latter enables having less material, e.g., in the intermediate region, however, it still allows for a two-sided attachment region for the coupling to the wheel suspension, while the former enables a reinforced strength and stiffness, without the necessity of having to provide additional accommodation space in the vehicle, in comparison to a yoke scaled up in size. In one embodiment, a stop surface for the damping unit is formed on an upper end of a reinforcing rib.

There may be embodiments, in which the intermediate region is not substantially changed with regard to its orientation with respect to the extruded part. In some embodiments, however, it may be useful to shape one or two legs of the connection system with respect to the extruded part, in order to enlarge the free space while still retaining its/their main extension direction as that of the extruded part. For example, a bend with an outward bowing may be utilized, e.g., with two bent sections or even three bent sections (as shown in FIG. 2). The main extension direction is still the first axis direction, as the largest directional component of a connection line between the opposite ends of the intermediate region (leg region) has the first axis as the Z-axis in a right-angled coordinate system.

In another embodiment, the extruded material of the extruded part, which forms at least one upper leg region, is also formed at least partially in the region of the axial length of the upper attachment region of the connection system. In this way, a fixed and stiff connection between the intermediate region and the upper attachment region is achieved. The end of such a leg region on the side opposite the lower attachment region may extend up to the upper end of the upper attachment region, however, it does not have to necessarily do so. In addition, the leg may extend in the form of an enlarged wall thickness of the enclosure formed by the upper attachment region, with a constant cross-sectional area in a plane orthogonal to the first axis, however, it may likewise extend with a reduced cross-sectional area in the direction of the upper end of the upper attachment region.

In one possible embodiment, the enclosure of the (first) receiving area may have an axial slot, which enables a clamping fit of the damping unit in the (first) receiving area. In addition, if the slot is closed or narrowed by a suitable clamping force, a stronger seat is formed for the damping unit received in the (first) receiving area.

This type of clamping device may be provided in the form of the upper leg region, which has a slot, which is aligned substantially with the slot in the enclosure. Screw bolts, for example, may be inserted into this upper leg region in order to reduce or widen the slot width. For this purpose, cutting steps and boring steps or thread tapping steps may be provided after the extrusion of the extruded part.

However, the clamping device may likewise be provided in the form an external part, which is not extruded together with the extruded part, in the form of a collar or a sleeve with a variable diameter.

One leg may be formed at least partially from the extruded material, which forms the enclosure in its upper section, it may likewise be formed from that material that forms the region with the low wall thickness in the enclosure.

Indeed, one preferred embodiment namely provides that the enclosure has at least one wall section of a first wall thickness and at least one wall section with a second wall thickness, which is larger than the first wall thickness. The connection between the intermediate region and the upper attachment region is preferably indicated by the sections of the larger, second wall thickness.

In one preferred embodiment, the first wall thickness is less than that the square root of the lowest cross-sectional area of the intermediate region in a cross-sectional area of a plane orthogonal to the first axis, in particular less than ⅔ of this square root, more particularly less than ½ of this square root. This enables an additional material savings and correspondingly the production of lightweight connection systems that still retain strong thickness and stiffness in the axial direction.

In another embodiment, the axial extension of the upper attachment region along the first axis may be greater than 1.2 times the smallest transverse dimension of the intermediate region with respect to the first axis, in particular 1.6 times this transverse dimension. This enables a larger inner surface area of the enclosure, at a given strength and stiffness through the intermediate region for increasing the holding force between the damping unit and the connection system in the installed state.

As already stated, the extrusion material preferably contains aluminum, in particular at least 80% aluminum, and is in particular an aluminum alloy, in particular from the 6000 or 7000 series. The EN-AW (AA) 6082 alloy is particularly preferred.

The dimensions, in particular the smallest cross-sectional area of the intermediate region, are not limited in any particular way, and may depend on the height and width of the yoke, which influence the bending moments that occur.

It is, however, preferred that the smallest cross-sectional area of the intermediate region is preferably at least 4 cm2, more preferably at least 5 cm2, particularly at least 6 cm2.

With regard to the production method, the invention provides a method for producing a connection system designed according to one of the preceding aspects, having the steps of extruding the extruded part, from which the connection system is then formed, and carrying out cutting steps to remove extruded material that is not part of the connection system. The production is preferably carried out with a continuous product flow. In addition, process steps may be carried out using a series of compression tools in one or more presses, in a connected process, wherein the presses carry out the cutting and optionally shaping steps. Additional machine tools may be provided in order to provide the connection system with slots, attachment holes (with or without threads), rounding offs, bevels, as desired for the final geometry of the connection system. As most of the extruded material, with respect to the main longitudinal orientation, is already present in virtually the correct orientation starting from the extruded part, the cutting or shaping processes may cause a change in the shape of the yoke, however, the main extension direction is maintained.

Furthermore, the invention likewise provides the preform of the connection system in the form of the extruded part, with the features already mentioned above, and also a wheel suspension having such a connection system and a vehicle with such a wheel suspension.

The yokes according to the invention may be scaled during production to adapt to different loads, e.g., if the same type of wheel suspension is used in an auto that has different weights for different model types, then correspondingly scaled extruded shapes may be utilized without having to change the overall design of the yoke. In the same way, the production may be easily changed to other variants (e.g., from a left-handed side variant to a right-handed side variant, in addition to the scaled variants).

When the aspects mentioned above are used, a desired yoke geometry may be produced in an easy way by using low installation space. Furthermore, based on the extrusion process, a strong and durable yoke geometry may be obtained, with strong and effective coupling interfaces for the damping unit and wheel suspension, even though the yoke is obtained in a comparatively light-weight type and likewise in a cost-efficient way.

In addition, a high level of integration of functions is obtained, in that the extrusion direction of the extruded part is the extension direction of the extruded material, which then forms the intermediate region of the connection system.

In another aspect, the invention relates to a connection system for connecting a damping unit of a vehicle inside a wheel suspension of the vehicle, having a first region, which at least partially surrounds a receiving area for the damping unit, received using a holding force holding it therein, in a circumferential direction with respect to its damping axis, and which first region is formed using a stabilizer coupling for a support on a stabilizer of the vehicle, and a second region for coupling to the wheel-side part of the wheel suspension, wherein the second region has two opposite leg regions, connected to the first region and spaced apart from another in a direction transverse to the damping axis, and a wheel suspension arrangement with such a connection system.

Connection systems of similar design are known, for example from EP 1 683 663 A1, whose FIG. 2 is reproduced in FIG. 8 of this application. A suspension strut designated with reference numeral 104' is arranged above the two legs of suspension strut fork 103' and represents a damping unit. Suspension strut fork 103' has a stabilizer coupling, on which a connection engages with a stabilizer 101'. The coupling is carried out via a bearing, flange mounted on the side of the suspension strut fork facing away from the observer, and on which a coupling rod 106' is articulated, which is connected at the other end in an articulated way to the stabilizer 101' via another connection bearing. Coupling rod 106' runs at an angle α' with respect to a vertical axis X'-X'. A deflection movement of the stabilizer 101' in the direction of arrow 102' is limited by a bracket 105', which is fixed using a fixing screw 114' in the lower region of the suspension strut fork, because a lower wheel guiding element is coupled between the two legs. A bearing screw head 111' thereby arrives at the stop at a front side 112' of a connection bearing 113'. A support force of the suspension strut fork on the stabilizer 101' is introduced into the stabilizer 101' via the articulation of the coupling rod 106' and the coupling rod 106'. The contact between the bracket 105' and the stabilizer 101' is not permanently present, but instead only during certain driving maneuvers. A relative movement between the stabilizer 101' and stop bracket 105' is minimized, as the stop is fixed on the suspension element, on which the stabilizer 101' is also linked via the coupling rod 106'. Due to the stop, a transverse movement of the stabilizer 101' is limited during driving operation, so that no excessive forces may load the coupling rod and thus the arrangement made from the connection system and damping unit.

The underlying object of the invention with respect to this additional aspect is to provide a connection system of the type listed at the outset, which provides a satisfactory combination of a simple design, in particular an easily producible design and reliable coupling to damping unit and stabilizer.

This problem is essentially solved by the invention in that the support force is at least partially guided via a clamping mechanism, which produces a clamping force to generate the holding force, in a connection system of the type listed at the outset.

The support force, or forces generally acting between the stabilizer and connection system, thus does/do not have to be guided via a separately provided stabilizer coupling, but instead is/are at least partially guided via a clamping mechanism, which is provided to exert a clamping force, due to which the damping unit is held in the receiving area of the first region of the connection system. As these forces extend across the stabilizer coupling, the latter is, in other words, integrated into the clamping mechanism.

The clamping mechanism is preferably a clip-like mechanism. In this mechanism, the free clip ends may be closed via one or more pin-like connection elements. Bolts guided through boreholes are conceivable here, which affect the clamping force through the application of a nut, or also, e.g., bolts, whose counter threads are integrated into the free ends of the clip. The clip mechanism may preferably be manufactured in one piece with the connection unit. A particularly preferred type of production is to form the connection system using an extrusion method, in particular from aluminum profiles (aluminum or an aluminum alloy). However, the invention likewise has advantages for connection systems produced in other ways, for example, by forging or casting. A production from sheet metal parts is likewise conceivable. In this case as well, there is no longer a requirement to repeatedly provide individual projections for couplings, which, e.g., interact with bolts, or to integrate said projections into the connection system, formed in particular as one part. In this way, both material is saved and the production method is also simplified overall.

The stabilizer coupling thus has a multifunctionality and functions on the one hand for coupling the stabilizer and on the other hand for generating the clamping force via the clamping mechanism.

In one preferred configuration, the support force is guided via a tensioning element, in particular a tensioning bolt of the clamping mechanism. It is, however, also basically conceivable that a projection for the stabilizer coupling and a projection for the clip-like clamping mechanism form a mutual or mutually formed projection.

In a continuation of the configuration mentioned above, it is provided that the tensioning element and the fixing element have a mutual extension axis and, in particular, the fixing element forms the tensioning element. In this way, additional components may be omitted.

In another preferred embodiment, the clamping mechanism has a projection, formed in particular as one piece with the first region, with a receptacle for the tensioning element, in particular with boreholes in two projection parts to be moved toward one another by the clamping force to be generated. A gap is formed between the projection parts, which is closed by the exertion of the clamping force, and by this means the damping unit is held in the receiving area. One or both of the projection parts may be utilized for coupling to the stabilizer.

In one functional configuration, facing surfaces of the projection parts contact one another in the installed state of sustained clamping force. In these types of solutions, support arms, clamped between the projection parts, which would have to be engaged with the damping unit outside of the receiving area, are not needed. Instead, the holding force acts only on the damping unit in the area of the receiving area.

In this context, it is additionally preferably provided that all components of the damping unit, lying at the height of the receiving area, and also parts fixedly connected to the same, lie radially within the receiving area. This reduces the installation space requirements and enables a more slender configuration of the connection system when the damping unit is received.

In another preferred embodiment, it is provided that the first region next to the projection of the clamping mechanism has no additional projections, in particular having boreholes. This once again facilitates the production of the connection system, in particular in the preferred variant of the extrusion method, however, also for the production methods of forging or casting, due to the simpler basic form. In the case of production via extrusion, it is preferred that the extrusion direction is that direction, in which the legs of the connection system extend in the connection system as finally produced. The clip mechanism and the legs are thereby preferably produced in one piece, wherein material regions of the extruded part, which no longer have any functions, are cut away. Thus, in an intermediate region, formed between the first and second regions of the connection system, enough free space remains to enable the passage of the drive shaft of a vehicle. In the case of extruded connection systems, for example, a bending of the leg regions may be provided for this purpose.

In a preferred embodiment, two legs already extend from the first region up to the second region, where their free ends form the opposite leg regions, and the drive shaft would then be guided through in the region of the intermediate region between the two legs. However, variants are also likewise preferred, in which only one leg trunk is provided in the intermediate region, which only forks into the two opposite leg regions at a distance from the first region. The application thus likewise comprises configurations of the second region in the form of "one leg forks".

Due to the connection system according to the invention, the above-mentioned advantages thus result in the simple configuration of the connection system, its simple production, and also its later easy installation.

In addition, a suspension strut fork with a damping unit and a connection system receiving the same is likewise placed under protection by the invention from one of the previously mentioned aspects, and also a wheel suspension arrangement with a connection system according to one of the previously mentioned aspects, and also a stabilizer coupled to its stabilizer coupling. The stabilizer may be fixed in a known way to the chassis on its other end.

BRIEF DESCRIPTION OF THE DRAWINGS

Additional details, features, and advantages of the invention are now described below with reference to the appended figures.

DETAILED DESCRIPTION

Figure 2:
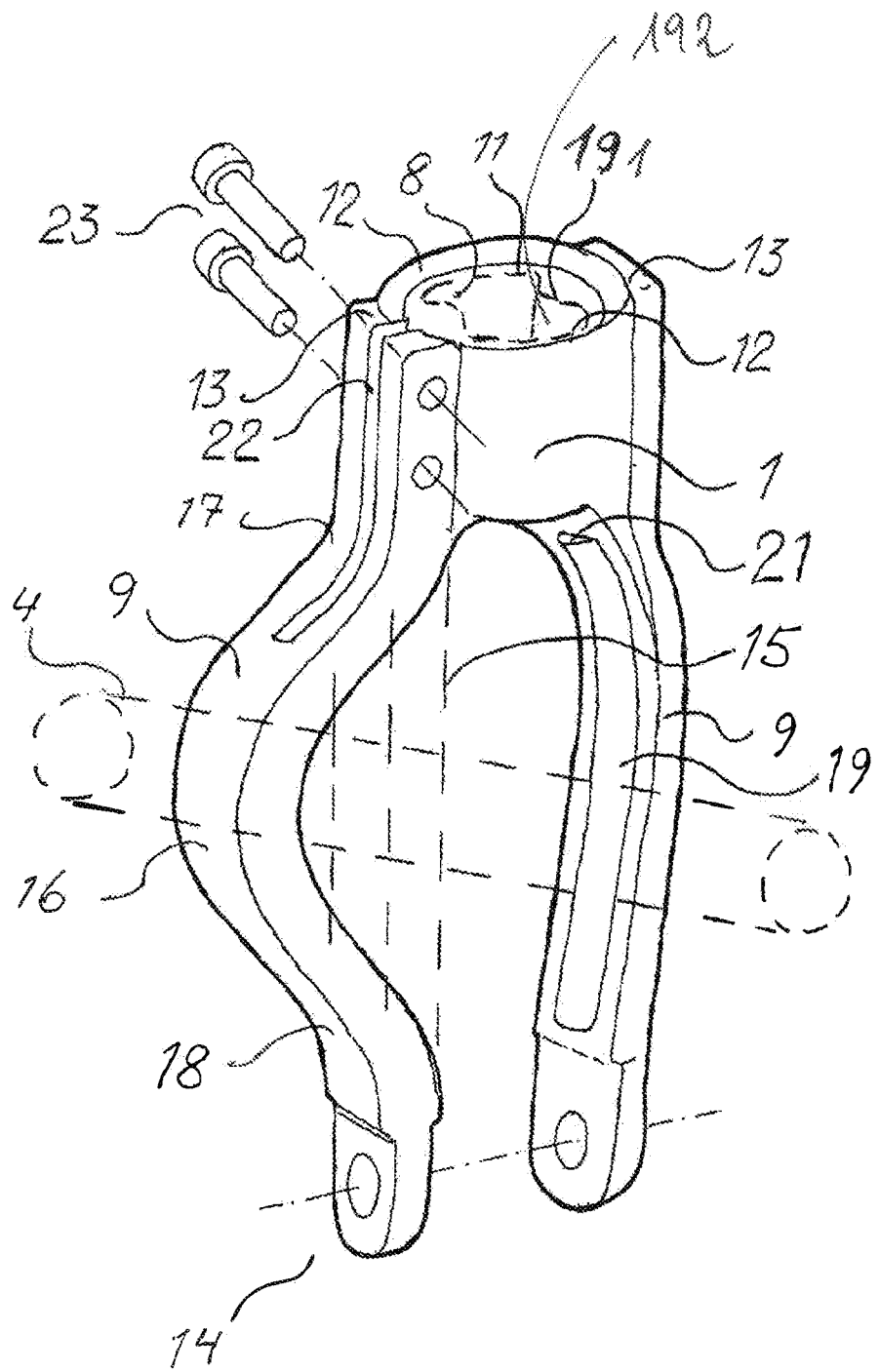
FIG. 2 shows a first embodiment of a yoke according to the invention.

In yoke 1 shown in FIG. 2, an attachment region for a damping unit (not shown) is formed by thin-walled sections 12 and thick-walled sections 13, which form an enclosure for accommodating the damping unit. In the present embodiment, the inner wall extrusion 11 is manufactured into a cylinder 8 at a high precision and is provided for this purpose. Clamping of the damping unit is achieved via a slot 22 and holes/threaded holes, for receiving threaded clamping bolts 23, incorporated into one of thick-walled regions 13 of the upper attachment region/the outer wall surface of the extrusion. Using slot 22, the yoke 1 is thus put into a position to effectively hold the damping unit, by means of the clamping force of bolt 23, on the basis of the exerted compression and thus the friction between the parts. By this means, the damper is operationally secured against pulling itself out of the yoke. The compression force of the yoke on the damper may be received by outer wall surfaces 12, 13 of the extrusion, which likewise include the thin-walled regions 12. It should be understood that the retaining grip of yoke 1 absorbs force in both the tensile and also the compression directions, wherein the maximum compression force may be three to four times higher than the highest tensile force, and the retaining capability would normally be exceeded only by friction couplings.

Details of the clamping mechanism may, however, be modified, the contact surface of which might be a surface located in another way, or, e.g., an annular surface, the dimensions and number of walls may be different; and the threads for the bolts may likewise not be integrated into the thick wall 13, but instead be formed by external nuts.

Figure 1:
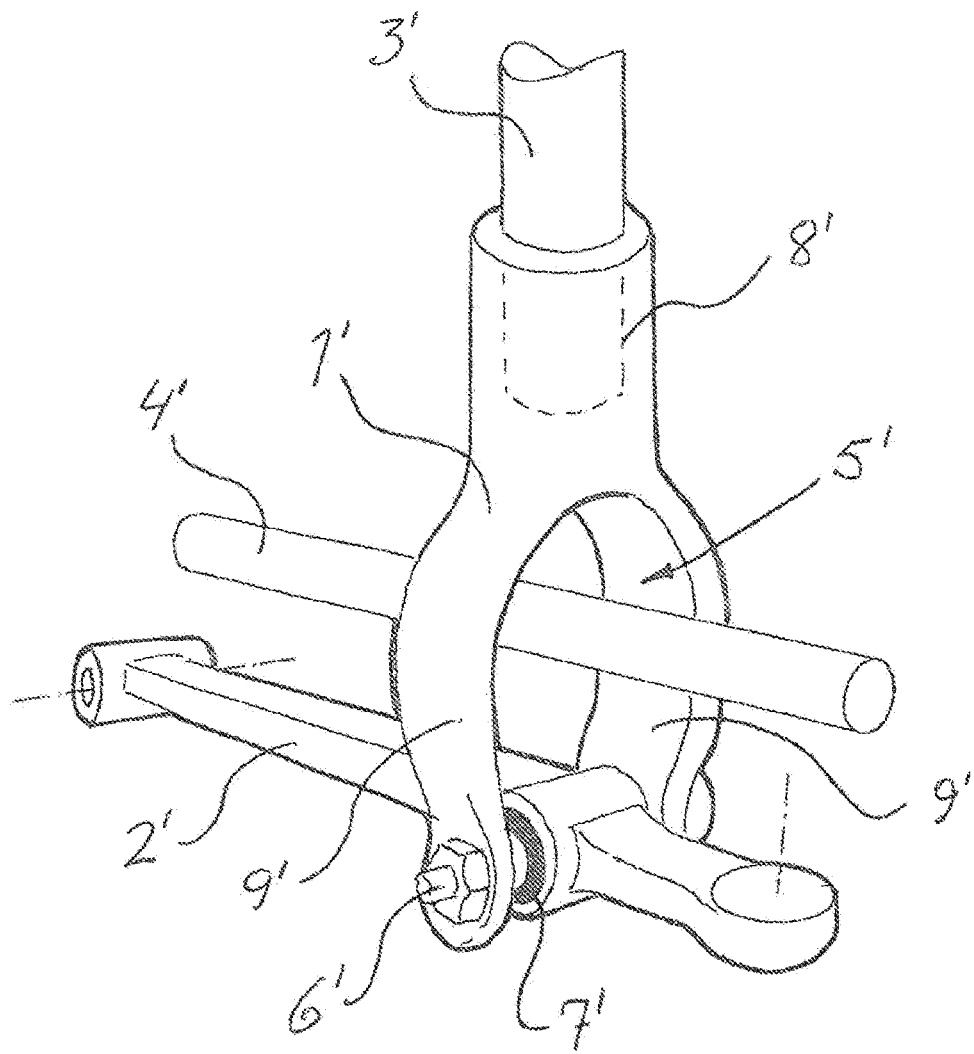
FIG. 1 schematically shows a basic shape of a yoke (prior art)

The thick-walled regions 13 extend from the upper attachment region in its main extension direction more or less parallel to the direction of the damping axis. In the present embodiment, however, one leg has bends 16, 17, 18, which enlarge the free space between legs 9, i.e., of thick-walled regions 13 below the enclosure formed together with the thin-walled sections 12. A fastening surface 14, provided at the free ends of thick-walled regions 13/legs 9, preferably has boreholes (cross drilling) for a connecting bolt that connects to a lower arm of a wheel suspension (shown only in FIG. 1). The bent regions of legs 9 and the fastening surface at the bottom side of the yoke are correspondingly formed as a fork-like arrangement in this embodiment. As is shown in FIG. 2, the lower region 14 is further machine processed, with respect to the extruded part, by beveling or rounding off the lower ends, and to form precise attachment surfaces in the section, in which the boreholes are arranged for the connecting bolts. Reference numeral 15 designates the direction/position of (left) leg 9 as extruded prior to the bending, with its extension direction in the extrusion direction.

Furthermore, legs 9 have a reinforcing rib 19 on their facing inner sides, said rib being the remainder of extruded material regions 191 (in FIG. 2 also indicated in the upper attachment region). In the present embodiment, finished yoke 1 itself no longer contains projection 192 within the inner surface, as this was cut away by a machining process subsequent to the shaping of the extruded part, which underlies the forming of yoke 1. The surface 21 on the reinforcing rib 19 designates an original surface, which appears at the end of the respectively processed region. This surface 21 may be formed as flat or with a radius. In addition, this surface may define a height arrangement of the damper with respect to yoke 1. In addition, this surface is likewise favorable for absorbing vertical forces, which exceed the capability of the friction connection to the damping device, which yoke 1 transfers from the lower suspension arm of the wheel suspension (not shown in FIG. 2).

On the one hand, dashed lines show drive shaft 4, which extends through the free space between the legs 9. On the other hand, the dashed lines likewise indicate the extrusion direction 15 of the thick-walled regions 13/legs 9. It is clear that the extrusion direction is the main extension direction of legs 9, which direction is maintained in yoke 1, aside from bends 16, 17, 18, which are processed into leg 9 in order to create enough free space for the passage of drive shaft 4.

It is understood that one leg or both legs may be bent. It is further understood that the legs may be bent differently from one another.

A high-strength aluminum alloy, like the 6000 or 7000 series Al alloys, which unite the advantages of low weight and high strength, may be used as the material for yoke 1. The yoke is thus lightweight, corresponding to the requirements of vehicle designers, yet still able to transfer forces up to several tons in each of the directions.

Although a yoke with two legs 9 in the intermediate regions is shown in FIG. 2, one-legged yoke designs are possible.

Figure 3:
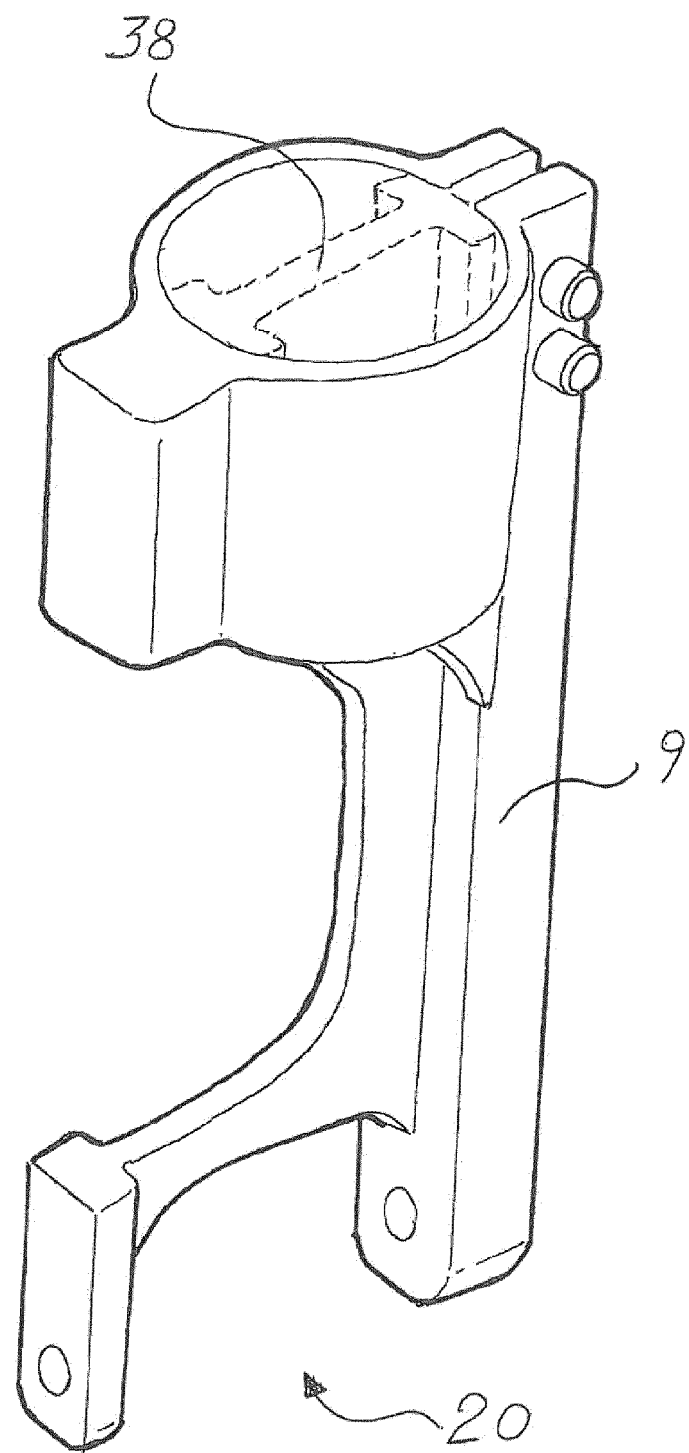
FIG. 3 shows another embodiment of a yoke according to the invention.

In the embodiment from FIG. 3, the extrusion underlying the yoke has an inner wall (web 38), which is connected to the inner walls of the enclosure. In the subsequent machining process, the intermediate region of one leg and part of the web are cut away from the extrusion, wherein a part of the web 38 is left as a reinforcing rib on the other leg 9, and as a connection to the lower leg region of the leg cut out in the intermediate region. An additional cutout is carried out from below in order to obtain the lower attachment regions with the two lower sections 20 spaced apart from one another, similar to the lower attachment region from FIG. 2.

Web 38 is shown once again in FIG. 3 with a dashed line inside of the accommodation space for the damping unit, however it is no longer present in the upper attachment region of the finished yoke.

Figure 4:
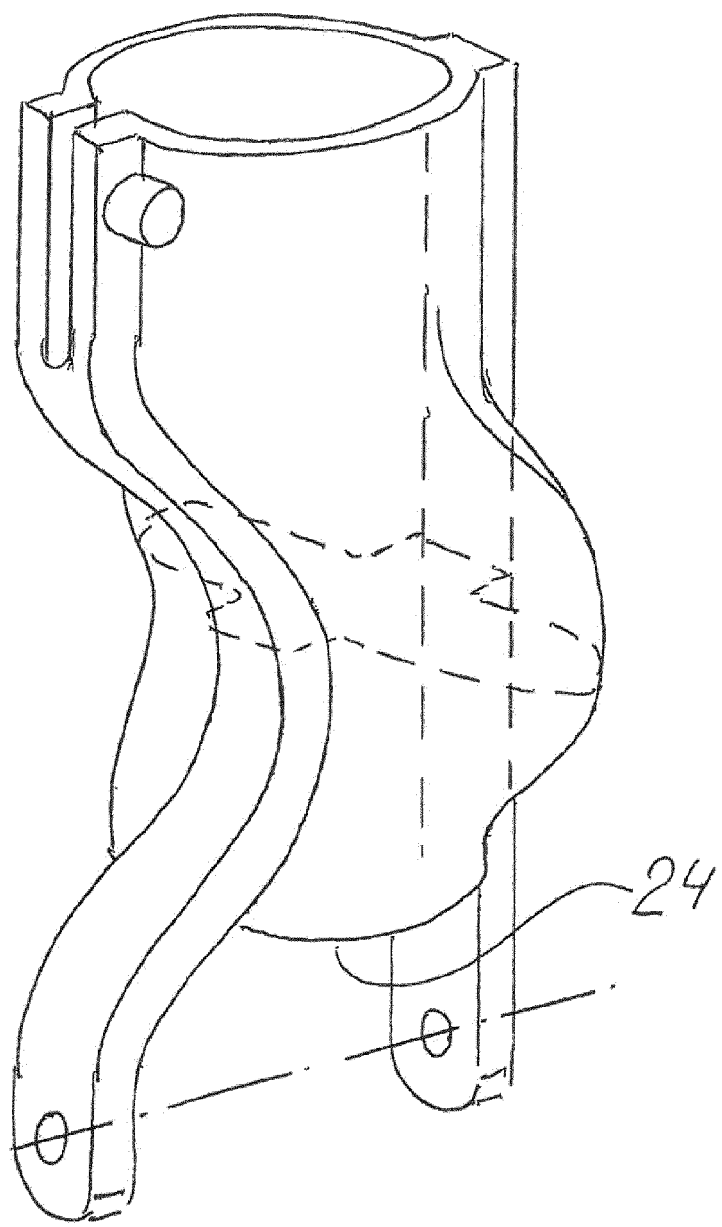
FIG. 4 shows another embodiment of a yoke according to the invention.

In the embodiment shown in FIG. 4, there is no connection bridge of this type, as in FIG. 3, however, the extruded part/the extrusion is shaped by compression in order to create the free space for the drive shaft. Once again, the extruded part receives cut outs 24 on the bottom side in order to define the attachment space for the coupling to the wheel suspension.

Figure 5:
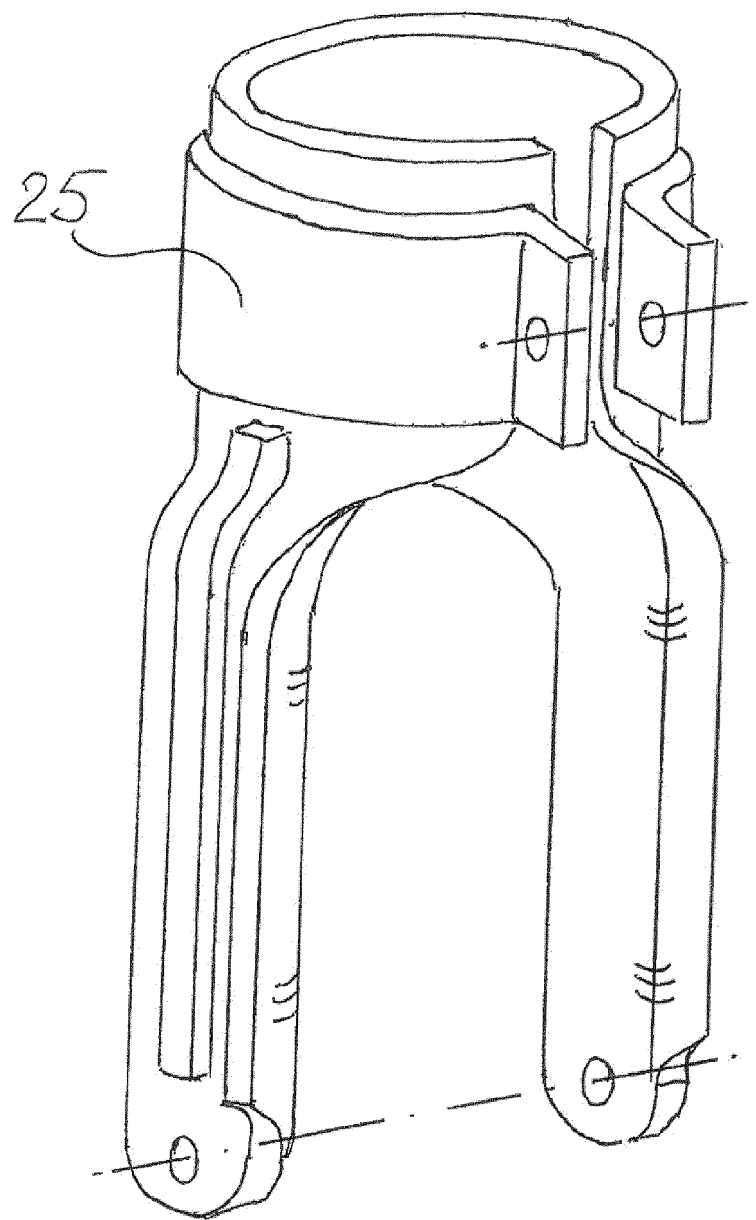
FIG. 5 shows another embodiment of a yoke according to the invention.

In the embodiment from FIG. 5, a yoke is shown which is obtained by cutting and shaping an open extrusion, which is closed on the upper side by a separate clip 25. The free space is achieved by cutting away material and/or a few bendings, as is shown in FIG. 5. In addition, reinforcing ribs may be retained on the outer surfaces via the extrusion (and are cut away in the axial section of the upper attachment region).

Figure 6:
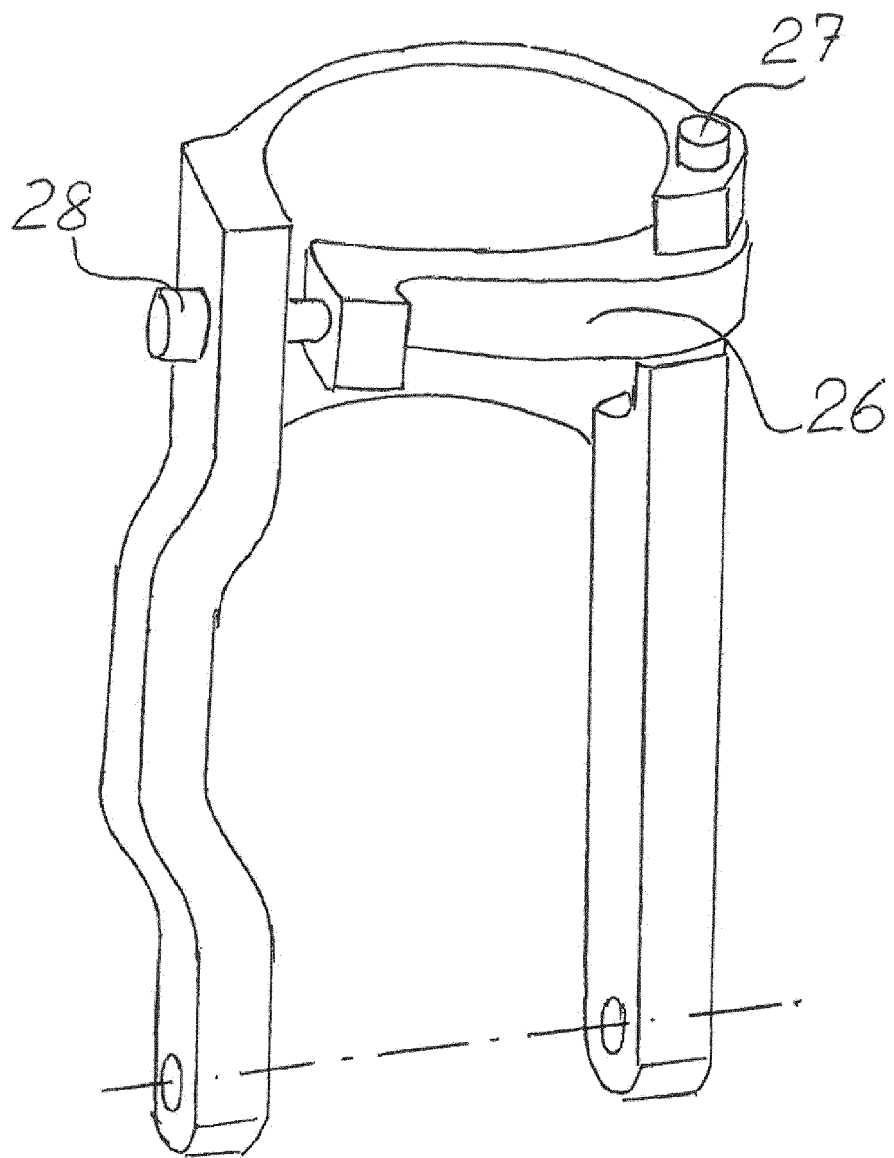
FIG. 6 shows another embodiment of a yoke according to the invention.

In the embodiment from FIG. 6, yoke 1 is cut out of an open extruded profile, wherein a closing part is provided on the upper side by a hinge-like connecting part 26, which may be provided as an external part and is introduced into an axial cutaway of one of the legs, and may be fixed therein by means of a hinge pin 27, wherein this part 26 may reach the other leg to close the accommodation space for the damping unit using a clamping bolt/clamping screw 28.

Figure 7:
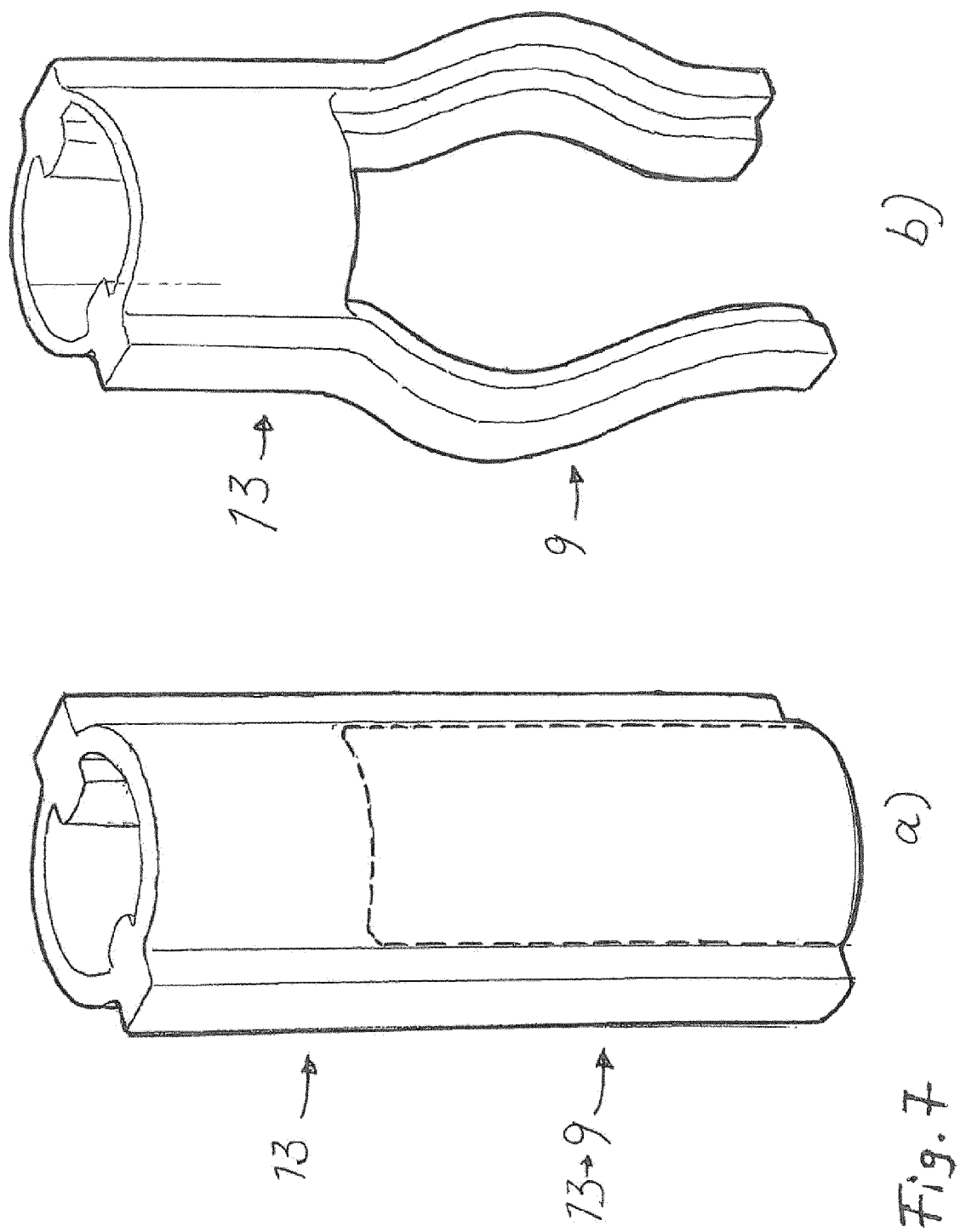
FIG. 7 shows a comparison between one shape of a yoke of the invention and the extruded part, from which it is generated.
Figure 8:
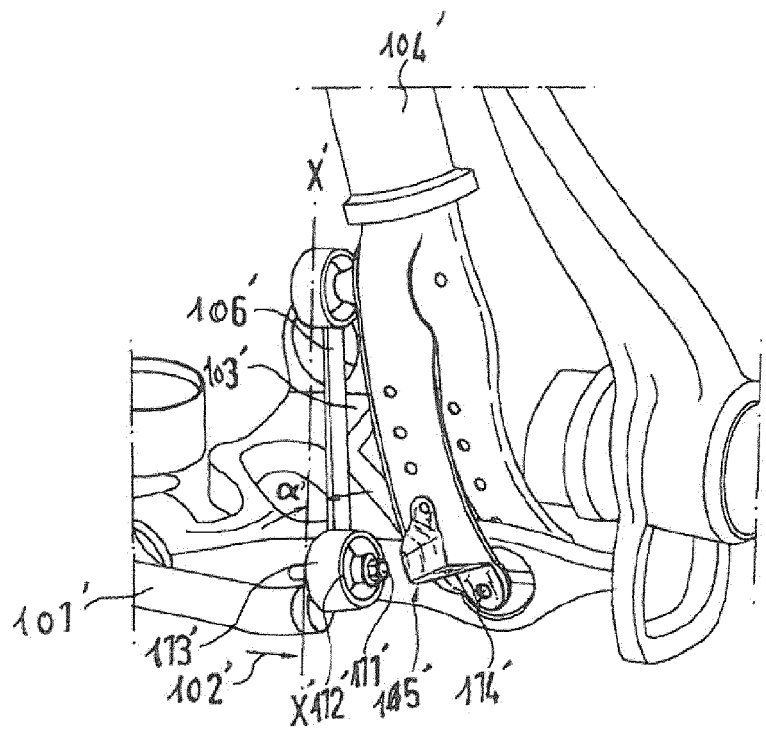
FIG. 8 shows a region of a wheel suspension with a suspension strut fork according to the prior art.

The base form of a yoke (FIG. 7B) is shown in FIG. 7, which, after processing, forms a yoke similar to that shown in FIG. 2. It is clear that the extruded material 13, which forms the thick-walled regions of the closed, extruded profile (FIG. 7A), extends in the extrusion direction, wherein the lower part thereof, after the cutting away of the material forming the thin-walled regions, forms the legs for the intermediate region of the yoke, with the lower region at the free leg ends.

As a specific example, a yoke may be produced, like that shown in FIG. 2. For this purpose, a blank is utilized made of an aluminum alloy made from EN-AW (AA) 6082, said blank fitting the extruding tool for extruding a raw profile similar to that shown in FIG. 7A. Afterwards, a heat treatment (solution annealing) is carried out and, e.g., a water quenching may be carried out before (e.g., at room temperature) the central region of the raw profile is stamped out below the upper attachment region. The shape of the legs is then formed in a press by the application of a longitudinally directed force, in order to arrive at the shape of the finished yoke. End processing steps, like the formation of holes/treads and likewise artificial aging, may be carried out to finish the yoke.

From the above, it is clear that other combinations are possible besides those shown in FIGS. 2 to 7, in order to form a yoke according to the present invention.

Figure 9:
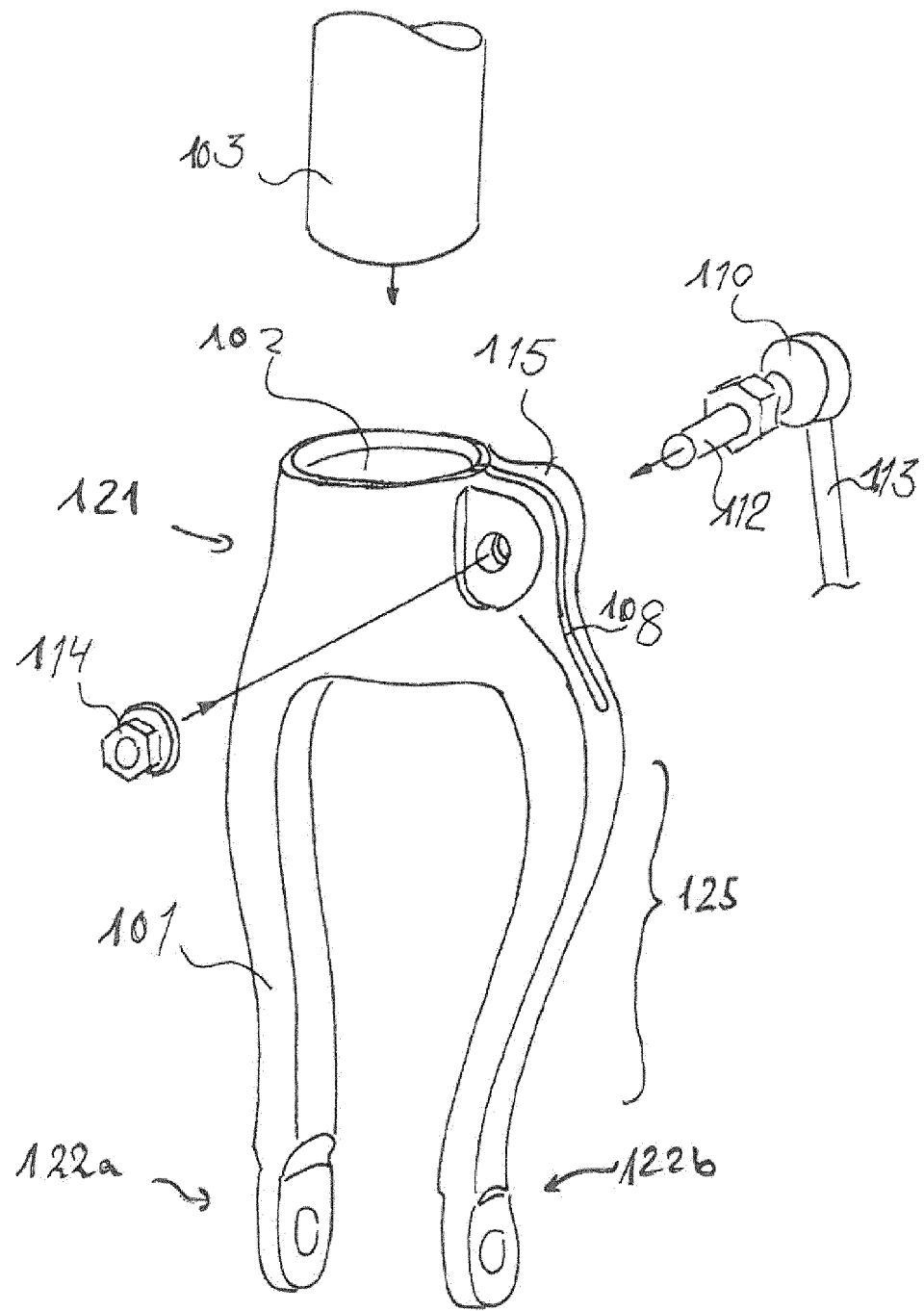
FIG. 9 shows a connection system and partially coupled parts, in particular a damping unit.

A connection system 101 is depicted in FIG. 9, which has a cylindrical opening 102 at its upper region in FIG. 9, said opening leading to a receiving area, enclosed by an upper region 121 of the connecting system, in which receiving area a damping unit 103 may be inserted and received therein. The opening 102 and the receiving area are not completely enclosed in the circumferential direction (with respect to the damping axis), instead, a slot 108 is formed, which separates a projection 115 into two projection parts to the left and right of slot 108. The projection 115 has a borehole, which is designed to receive a pin or bolt 112. When a counter-nut 114 is screwed onto bolt 112, inserted through the borehole of projection 115 and tightened, the slot is narrowed or closed under the effect of the clamping force thus generated, and clamps the damping tube 103 in the receiving area of the connection system 101 in a clip-like way. In one modification, bolt 112 might also be screwed into a thread, matching its thread, in the rear projection part of projection 115 with respect to the insertion direction.

Figure 11:
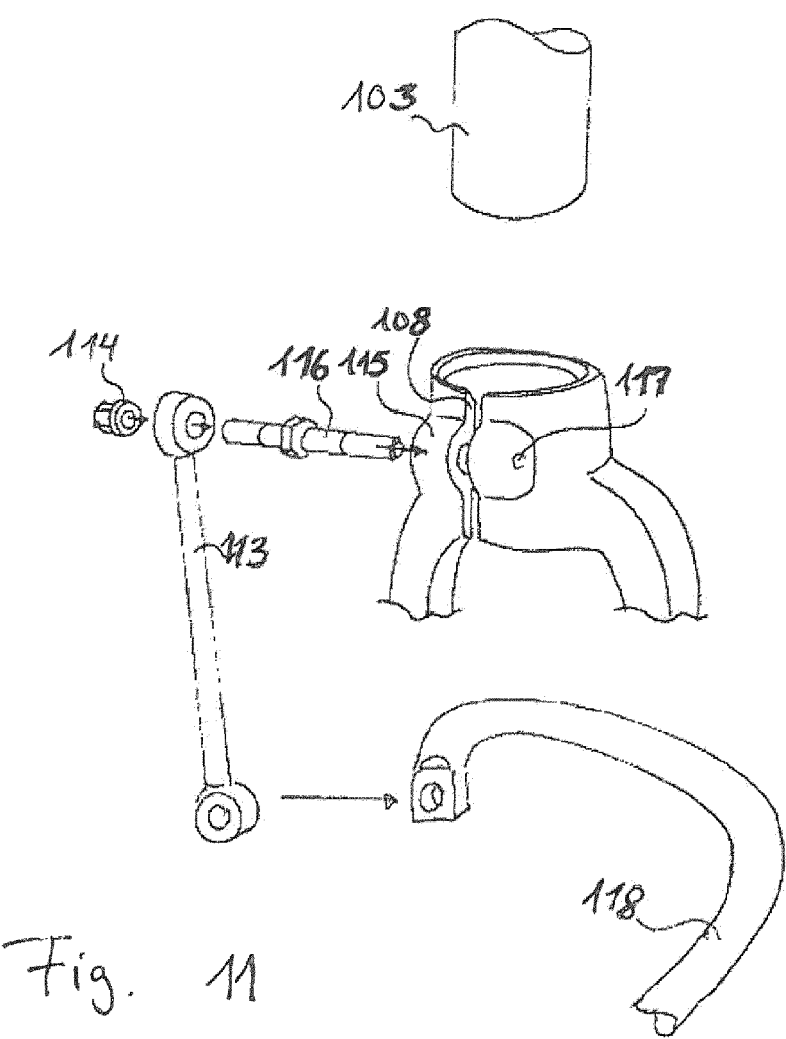

At the opposite end of bolt 112, an articulated connection 110 is provided, with which a coupling rod 113 is connected, which leads in turn to a stabilizer, not shown in FIG. 9 (see, e.g., FIG. 11). The slender and particularly simple configuration of the connection system 101, made from few components, is clear, in particular, connection system 101 is formed of one piece with its legs, the delimitation of the receiving area, and projection 115. A preferred production method is extrusion, however, the embodiment example shown in FIG. 9, in particular, may also be produced in a simplified way by forging or casting. A separated projection for the coupling of the stabilizer is no longer necessary and no longer provided. In the embodiment from FIG. 9, the projection, and thus the stabilizer coupling, is formed by a continuation of one leg of connection system 101 across the height region of the receiving area, when viewed in the damping direction.

A suspension arm of a wheel suspension may be fixed on the end of connection system 101 opposite opening 102 and between leg regions 122a and 122b. In this embodiment, each leg region 122a, 122b continues to the upper region.

Figure 10:
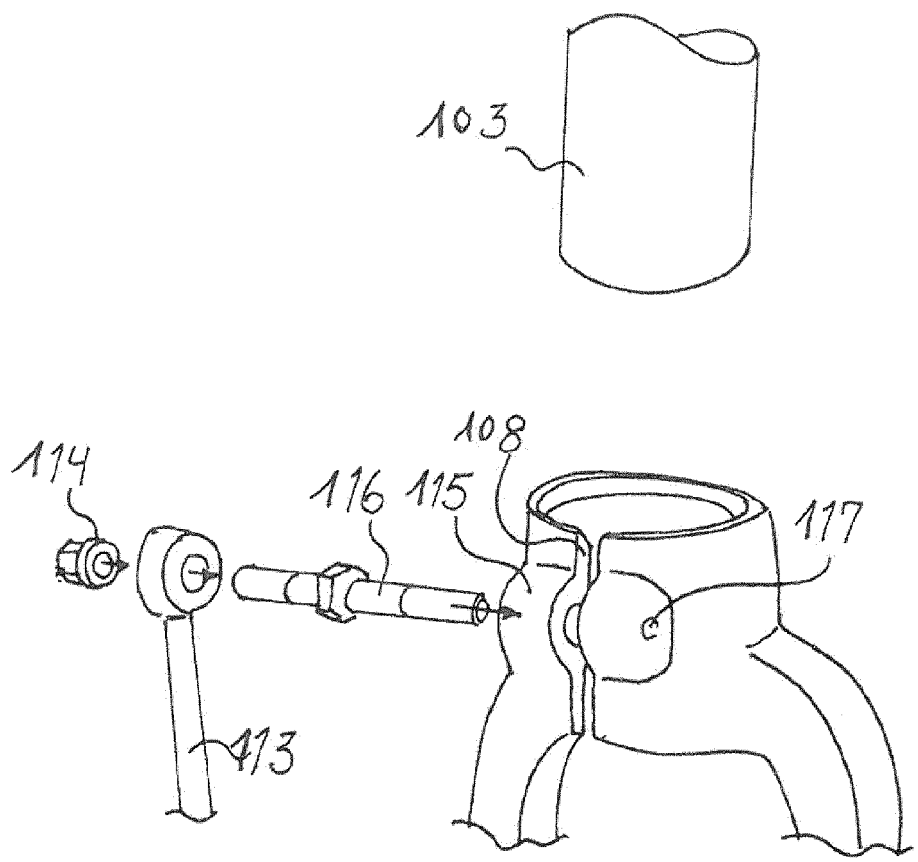
FIG. 10 shows an alternative configuration of a first region of a connection system, FIG. 11 schematically shows a stabilizer to the configuration from FIG. 9.

In a further embodiment example, which is shown in FIG. 10, gap 108 and projection 115 are provided with a borehole, whose extension direction runs essentially in a direction opposite with respect to the lower end regions (not shown in FIG. 10). In this embodiment example, a tensioning bolt 116, threaded on both sides, engages in a borehole 117 in shoulder 115, which borehole is provided with an internal thread. A coupling rod 113 is fixed with a nut 114 on the opposite end of bolt 116.

It is clear that a plurality of specific arrangements is possible, which facilitate the coupling of the stabilizer via a projection 115, said stabilizer being provided to generate the clamping force which causes the holding force, without an additional projection being necessary for the stabilizer assembly.

The depiction from FIG. 11 corresponds to that from FIG. 10, however, a continuation of coupling rod 113 is illustrated as well as a stabilizer 118, at the free end of which the end of coupling rod 113 facing away from bolt 116 may be coupled.

In preferred embodiments, the boreholes in projection 115 extend in an extension direction essentially parallel to the coupling axis of the leg regions lying opposite one another, or essentially perpendicular to the same, depending on the type of installation orientation of connection system 101 and stabilizer 118.

Figure 12:
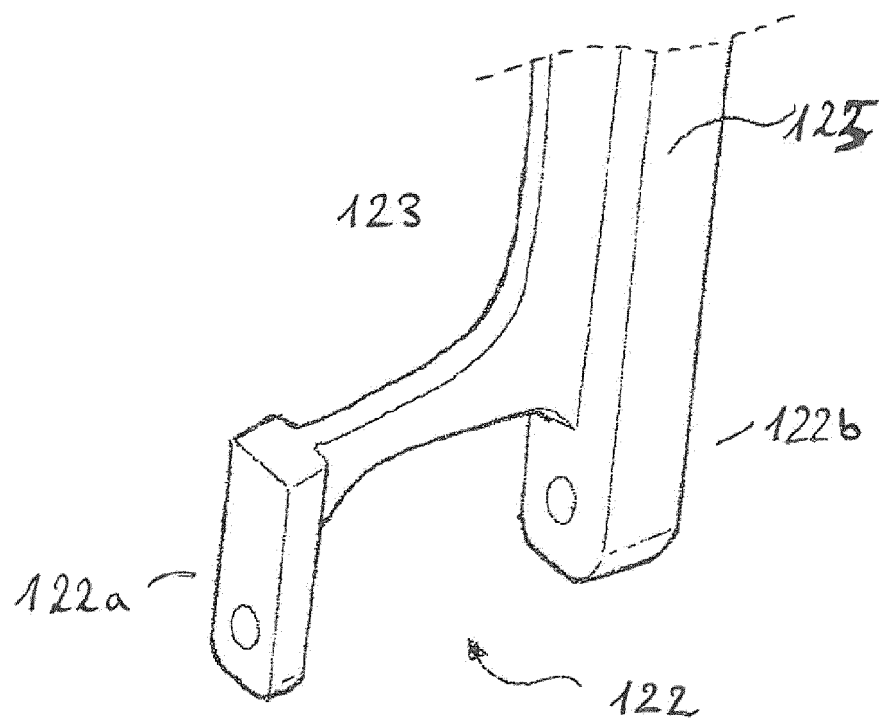
FIG. 12 shows an alternative configuration of a second region and intermediate region of a connection system.

Another alternative configuration of the second (lower) region and the intermediate region between the first and second regions is shown in FIG. 12. In this case, both leg regions 122a, 122b facing one another do not continue across the intermediate region 125, but instead, only the right leg is continuous in FIG. 12, and the leg region lying opposite in the second region only forks at a distance from the first region, so that an indentation 123, open on one side, is formed at the intermediate region 125.

Accordingly, the features of the preceding description are not to be considered as limiting with respect to the figures. Instead, features from the subsequent claims and the preceding description are essential to the present invention alone and in combination. Thus, as is already to be understood for the non-exclusive free space or for possibilities for forming the free space, this may be achieved by cutouts of material from the extruded material underneath the upper attachment region and additionally by shaping this material.

The amount of cutaway material may thereby also amount to more than 40% or more.

It is understood that the introduction of compression force of the yoke to the damper may be carried out overwhelmingly or virtually completely via the thick-walled regions 13 of the upper attachment region.

Figure 13:
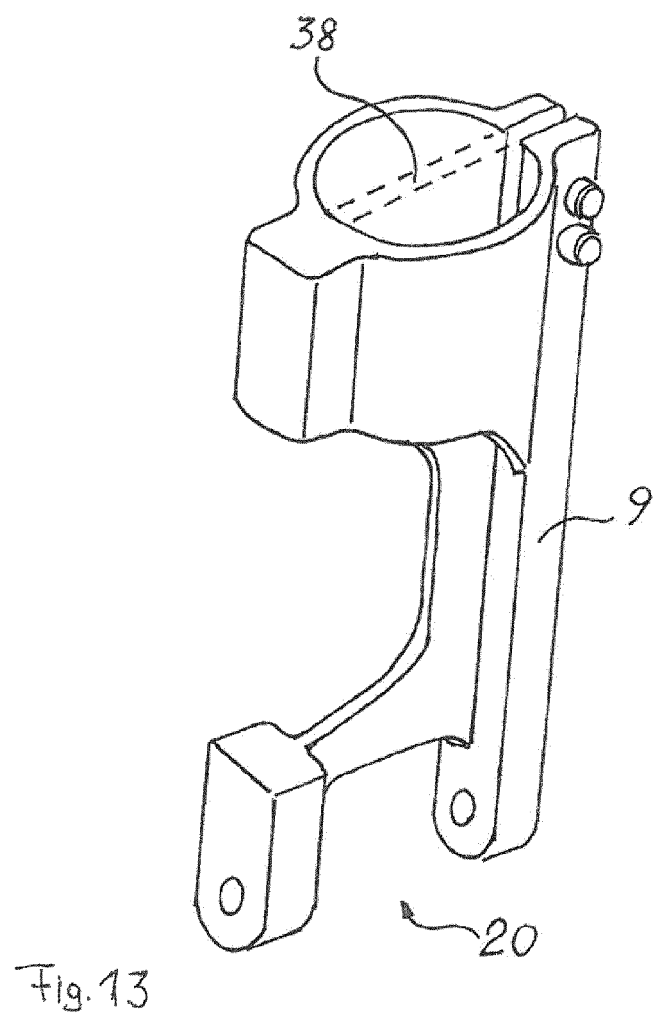
FIG. 13 shows a yoke.

Web 38 may also be made slimmer, without a thickening in the region of the web edges forming the reinforcing ribs, see also FIG. 13.

Figure 14:
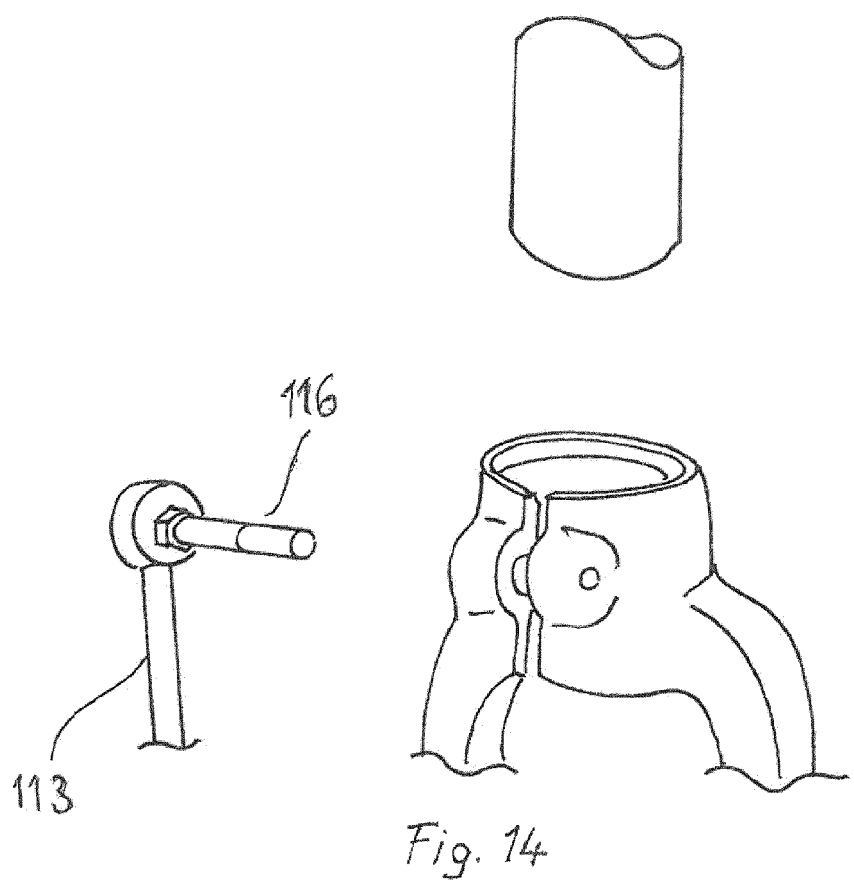
FIG. 14 shows a connection system with coupleable parts.

The tensioning bolt 116 may also be screwed into a thread of coupling rod 113, or also be formed as one piece with the coupling rod, see also FIG. 14.

The angle between the boreholes in shoulder 115 and the coupling axis of the leg regions lying opposite one another is not limited to parallel or orthogonal variants; it may also lie, e.g., in the range [−70°; 70°].

The invention claimed is:

1. A connection system for attaching a damping unit of a vehicle inside of a wheel suspension of the vehicle, wherein the connection system has an upper attachment region for attaching the damping unit, wherein the attachment region at least partially surrounds a receiving area for the damping unit, wherein the receiving area extends about a first axis which is the damping axis of the damping unit, a lower attachment region for coupling to the wheel-side part of the wheel suspension, wherein the lower attachment region includes two lower sections spaced apart from one another with an attachment space therebetween, and an intermediate region, which connects the upper attachment region to the lower attachment region, wherein a main extension of the intermediate region corresponds to the direction of the first axis, and wherein a free space of the intermediate region enables the passage of a drive shaft of the vehicle, characterized in that the connection system is manufactured from an extruded part, whose extrusion direction is the extension direction of the extruded material, which then forms the intermediate region of the connection system, wherein the axial extension of the upper attachment region along the first axis is larger than 1.2 times the smallest transverse dimension of the intermediate region with respect to the first axis, and wherein the free space is formed at least partially by a cutout of extruded material underneath the extruded material that forms the upper attachment region.

2. The connection system according to claim 1, in which an axial extension of the connection system along the first axis corresponds to a cutaway length of the extruded part or is shorter by an amount, by which the connection system is shortened due to a bending of a leg or legs, which enlarges a free space for passage of the drive shaft.

3. The connection system according to claim 1, in which the extruded part has an extruded material region, which extends partially within the receiving area and then partially forms a functional element of the connection system.

4. The connection system according to claim 3, in which the functional element is one or more reinforcing ribs for the one leg or the two legs, or a bridge connecting the two lower sections.

5. The connection system according to claim 1, in which one leg or two legs of the connection system is or are shaped with respect to the extruded part in order to enlarge a free space, while the one or two legs maintain the main extension direction.

6. The connection system according to claim 1, in which extruded material of the extruded part, which forms at least an upper leg region, is also formed at least partially in the region of the axial length of the upper attachment region of the connection system.

7. The connection system according to claim 1, in which an enclosure of the receiving area has an axial slot which enables a clamping fit of the damping unit in the first receiving area.

8. The connection system according to claim 6, in which the upper leg region has a slot, and a clamping device is provided in order to reduce or enlarge the slot widths.

9. The connection system according to claim 7, in which a clamping device for clamping the damping unit is provided by parts which are not extruded together with the extruded part.

10. The connection system according to claim 1, in which one leg is formed at least partially from extruded material that forms an enclosure in its upper section.

11. The connection system according to claim 1, in which an enclosure has at least one wall section with a first wall thickness and at least one wall section with a second wall thickness that is larger than the first wall thickness.

12. The connection system according to claim 11, in which the first wall thickness is less than the square root of the smallest cross-sectional area of the intermediate region in a cross-sectional area in a plane orthogonal to the first axis.

13. The connection system according to claim 1, in which the extruded material contains at least 60% aluminum or aluminum alloy, wherein the smallest cross-sectional area of the intermediate region is at least 4 $cm^2$.

14. A wheel suspension comprising a connection system according to claim 1.

15. A vehicle with a wheel suspension according to claim 14.

16. A method for producing a connection system designed according to claim 1, having the steps of extruding the extruded part, from which the connection system is manufactured, and carrying out cutting steps to remove extruded material that is not part of the connection system.

17. The method according to claim 16, in which forming and shaping steps and/or boring steps are carried out on the extruded part.

18. An extruded part, which is designed to form a connection system designed according to claim 1 after cutting off excess extruded material, and after carrying out additional shaping steps, wherein the extrusion direction of the extruded part is the main extension direction of the extruded material region, which then forms the intermediate region of the connection system.

19. The connection system according to claim 1, for the attachment of a damping unit of a vehicle inside of a wheel suspension of the vehicle, having
    a first region, which at least partially surrounds a receiving area for the damping unit, received using a holding force holding it therein in a circumferential direction with respect to its damping axis, and which is formed across a stabilizer coupling for a support on a stabilizer of the vehicle, and
    a second region for coupling to the wheel-side part of the wheel suspension, wherein the second region has two opposite leg regions, connected to the first region and spaced apart from one another in a direction transverse to the damping axis,
    characterized in that the support force is guided at least partially via a clamping mechanism, which produces a clamping force to generate the holding force.

20. The connection system according to claim 19, in which a stabilizing coupling is integrated into the clamping mechanism.

21. The connection system according to claim 20, in which the clamping mechanism is a clip-like mechanism.

22. The connection system according to claim 20, in which the support force is guided via a tensioning element of the clamping mechanism.

23. The connection system according to claim 19, in which the stabilizer coupling has a fixing element.

24. The connection system according to claim 22, in which the tensioning element and a fixing element have a mutual extension axis.

25. The connection system according to claim 19, in which the clamping mechanism has a projection, formed as one piece with the first region, with a receptacle for a tensioning element, with boreholes in two projection parts to be moved toward one another by the generation of the clamping force.

26. The connection system according to claim 25, in which facing surfaces of the projection parts contact one another in the installed state of sustained clamping force, or are separated by a remaining air gap.

27. The connection system according to claim 19, in which all components of the damping unit lying at the height of the receiving area, and parts fixedly connected to said damping unit, lie radially within the receiving area.

28. The connection system according to claim 19, in which the holding force only acts on the damping unit in the region of the receiving area.

29. The connection system according to claim 25, in which the first region does not have any additional projections aside from the projection of the clamping mechanism.

30. The connection system according to claim 19, in which free space, which enables the passage of a drive shaft of the vehicle, remains in an intermediate region formed between the first and the second regions.

31. A suspension strut fork with a damping unit and the connection system, according to claim 19, receiving the damping unit.

32. A wheel suspension arrangement with the connection system according to claim 19 and a suspension strut fork, and also a stabilizer coupled to the stabilizer coupling.

33. A motor vehicle with the wheel suspension arrangement according to claim 32.

* * * * *